(12) United States Patent
Meidan et al.

(10) Patent No.: US 11,829,396 B1
(45) Date of Patent: Nov. 28, 2023

(54) METHOD AND SYSTEM FOR RETRIEVAL BASED ON AN INEXACT FULL-TEXT SEARCH

(71) Applicant: WIZSOFT LTD., Tel Aviv (IL)

(72) Inventors: Abraham Meidan, Tel-Aviv (IL); Oren Zbeda, Bnei-Brak (IL); Assaf Avrahami, Gilon (IL); Shira Cohen, Modi'in Illit (IL)

(73) Assignee: WIZSOFT LTD., Tel Aviv (IL)

( * ) Notice: Subject to any disclaimer, the term of this patent is extended or adjusted under 35 U.S.C. 154(b) by 0 days.

(21) Appl. No.: 17/583,623

(22) Filed: Jan. 25, 2022

(51) Int. Cl.
*G06F 16/33* (2019.01)
*G06F 16/31* (2019.01)

(52) U.S. Cl.
CPC ........ *G06F 16/3343* (2019.01); *G06F 16/313* (2019.01)

(58) Field of Classification Search
CPC ............................ G06F 16/3343; G06F 16/313
See application file for complete search history.

(56) References Cited

U.S. PATENT DOCUMENTS

| | | | | |
|---|---|---|---|---|
| 4,341,929 A * | 7/1982 | Alexander | .......... | H04M 1/2748 707/999.005 |
| 5,668,928 A * | 9/1997 | Groner | .................. | G10L 15/193 704/251 |
| 10,409,861 B2 | 9/2019 | Meidan et al. | | |
| 2008/0208833 A1* | 8/2008 | Basmov | .............. | G06F 16/2452 707/999.005 |
| 2008/0263159 A1* | 10/2008 | Choi | ...................... | H04L 51/212 709/206 |
| 2010/0324888 A1* | 12/2010 | Rachamim | .............. | G10L 15/19 704/9 |
| 2011/0225161 A1* | 9/2011 | Zhong | ................... | G06F 16/355 707/E17.09 |
| 2020/0110767 A1* | 4/2020 | Alakuijala | .......... | H03M 7/3088 |
| 2021/0097087 A1* | 4/2021 | Frison | ................... | G06F 16/243 |

* cited by examiner

*Primary Examiner* — Baoquoc N To
(74) *Attorney, Agent, or Firm* — The Law Office of Joseph L. Felber

(57) ABSTRACT

The disclosed search engine and search engine system apply a variety of criteria to find specific information within a full-text dataset, even when its user cannot recall the exact text or exact spelling of the desired information. The criteria cause retrieval of text not only when the sequence of words in the query matches the sequence of words in the text identically but also when the difference between sequences is that one of the words in a sequence is missing, added, replaced, or replaced with a synonymous word or a word having phonetic similarity. Another criterion is that the two words in the query sequence differ in order from the two words in the text sequence to be retrieved. The above criteria are applied after stop list words are disregarded. The search engine accordingly enables a user to find text more easily in large full-text datasets by inexact text searching.

14 Claims, 3 Drawing Sheets

TEXT SECTION: *"Attached please find a contract of purchasing a building from Mr. Ellenberg. We were supposed to get our payment two weeks ago but no payment has been received."*

| CRITERION FOR RETRIEVAL | SAMPLE QUERY |
|---|---|
| Text and query are identical | *"contract of purchasing a building from Mr. Ellenberg"* |
| | *"contract for purchasing a building from Mr. Ellenberg"* |
| Text and query are identical, except one word is missing | *"contract of purchasing from Mr. Ellenberg"* |
| | *"contract of purchasing an old building from Mr. Ellenberg"* |
| Text and query are identical, except one word is replaced | *"contract of purchasing a house from Mr. Ellenberg"* |
| Text and query are identical, except two adjacent word are in opposite order | *"purchasing contract of a building from Mr. Ellenberg"* |
| Text and query not identical but have phonetic similarity | *"contract of purchasing a building from Mr. Allenburg"* |
| Text and query are identical, except one word is replaced with a synonymous word | *"contract of buying a building from Mr. Ellenberg"* |

FIG. 4

METHOD AND SYSTEM FOR RETRIEVAL BASED ON AN INEXACT FULL-TEXT SEARCH

BACKGROUND

A search engine is computer software that searches a dataset for specified information in response to receiving as a search argument a text string that is identical to or similar to the desired information. The text string may include one or more words, which collectively form the search query. The software resides on hardware for execution, so the terminology "search engine system" as used herein references search engine software and its supporting hardware. The supporting hardware typically includes a processor, storage, and at least one type of input/output device, such as a keyboard of a user input device, and a display for output.

One use of a search engine is to find specific information within a full-text dataset, such as in a set of stored emails, an archive of newspaper articles, a registry of patents, or a database of statute provisions. A search engine user will often begin using a search engine by entering as the search argument the exact text he (or she) expects to retrieve, or at least hopes to retrieve, in the dataset. Entering a search argument accordingly works well when the user is able to recall or otherwise to provide the exact text desired to find in the dataset.

Despite the wide-spread availability of search engines now, users still often encounter difficulties finding desired text in datasets. Accordingly, the present inventors studied the causes of the difficulties and subsequently developed new tools to enable finding desired text in a dataset more easily.

SUMMARY

The inventors found that one prevalent reason causing much difficulty finding desired text in a full-text dataset is that in many cases a user searching for a specific section of text cannot recall the exact text of the information he wants. For example, an attorney may search for an email message relating to a contract she prepared for purchasing a building from a seller named "Mr. Ellenberg." However, the attorney cannot remember an exact text string unique to the email message. If for example she searched for the words "contract" or "building," when hundreds of email messages in her dataset contain these words, she would retrieve too many results for which all or nearly all of them would not be the email she wants. In contrast, if the attorney instead searches for the word string "purchasing a building," she would fail to retrieve the desired email message, if the actual text therein is instead "purchasing a house from Mr. Ellenberg." A related problem would arise if the attorney wanted to search for the name "Ellenberg" but did not remember the exact spelling of that name. She would once again fail to retrieve the desired message, if she spelled the name incorrectly. Thus, without remembering enough about the exact text of the email she wanted, her search could retrieve either far too many results to be useful or so few that the desired email is not retrieved.

The present inventors thus realized that they could overcome the aforestated problems by developing a search engine that retrieves desired information even when the search argument entered does not provide the exact text of that information. Accordingly, the inventors developed the present invention, that which implements inexact full-text searching.

The invention may be embodied as a method of retrieving text from a full-text dataset that is segmented into text sections of text strings. The method includes: receiving by a search system from a user input device a text string to be searched as a query, the query text string including one or more words; when the query text string has one word only, retrieving text sections from the full-text dataset that include the query's one word or a phonetically similar word; and, when the query text string includes more than one word, retrieving text sections from the full-text dataset in which one or more of conditions apply after disregarding specified stop list words from both the query and the text sections. The conditions include: the sequences of words in the query and in the text section are identical; the sequences of words in the query and in the text section are identical, except that one word is missing in either the query or in the text section; the sequences of words in the query and in the text section are identical except that one word in either the query or in the text section is replaced by another word; the sequences of words in the query and in the text section are identical, except that two adjacent words in the query appear in the opposite order in the text section; and the sequences of words in the query and in the text section are identical, except that not more than a specified fraction of words in the query and in the text section are not identical but are phonetically similar.

The invention may further be embodied as a search engine system for retrieving text from a full-text dataset that is segmented into text sections of text strings, the search engine system comprising: one or more interfaces, a processor, and storage. The one or more interfaces are operative: (1) to receive from a user input device a text string to be searched as a query, the query text string including one or more words, and (2) to send to the user device search results. The processor is operatively connected to the one or more interfaces. The storage is operatively connected to the processor and holds instructions. The instructions, when executed, activate the processor to: when the query text string has one word only, retrieve text sections from the full-text dataset that include the query's one word or a phonetically similar word; and, when the query text string includes more than one word, retrieve text sections from the full-text dataset in which one or more conditions apply after disregarding specified stop list words from both the query and the text sections. The conditions include: the sequences of words in the query and in the text section are identical; the sequences of words in the query and in the text section are identical, except that one word is missing in either the query or in the text section; the sequences of words in the query and in the text section are identical except that one word in either the query or in the text section is replaced by another word; the sequences of words in the query and in the text section are identical, except that two adjacent words in the query appear in the opposite order in the text section; and the sequences of words in the query and in the text section are identical, except that not more than a specified fraction of words in the query and in the text section are not identical but are phonetically similar.

Embodiments of the present invention are described in detail below with reference to the accompanying drawings, which are briefly described as follows:

BRIEF DESCRIPTION OF THE DRAWINGS

The invention is described below in the appended claims, which are read in view of the accompanying description including the following drawings, wherein:

FIG. 4 provides a table of various text retrieval criteria and associated sample queries fulfilling the criteria.

DETAILED DESCRIPTION

Figure 1:
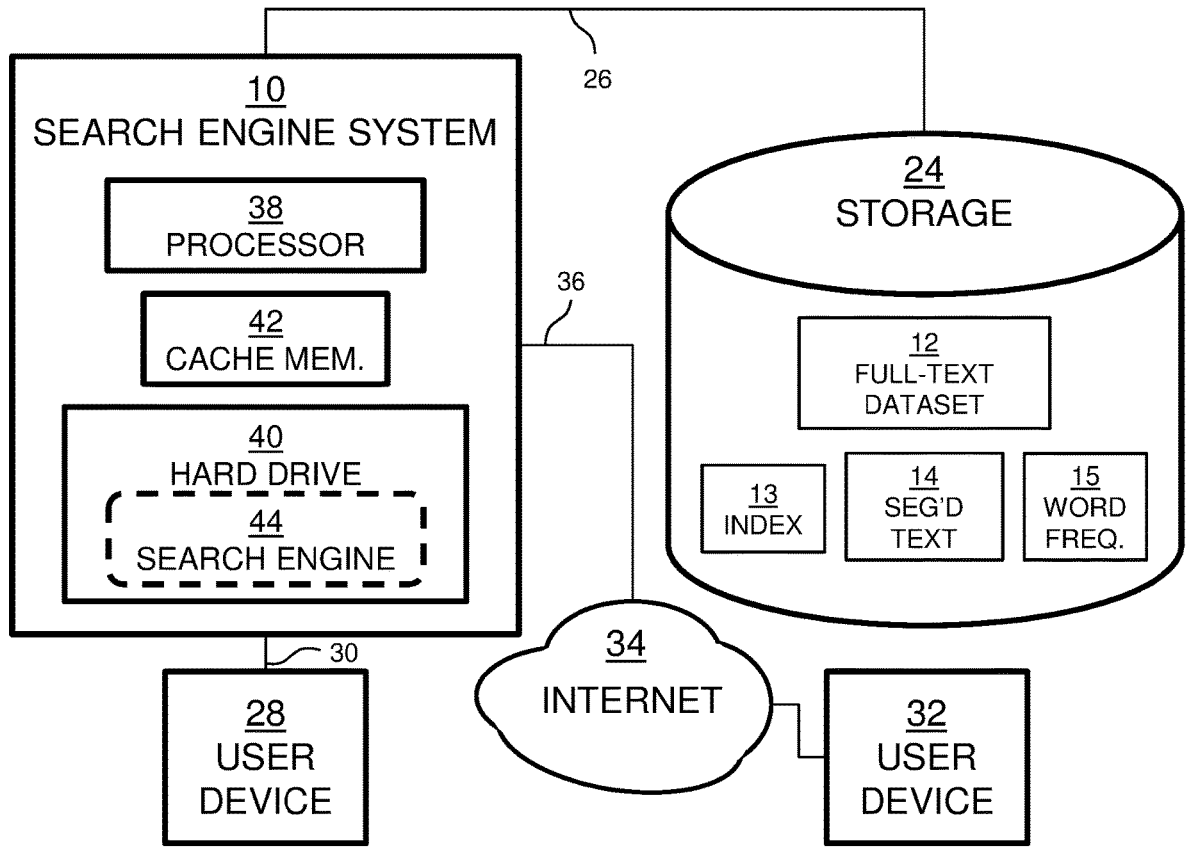
FIG. 1 provides a schematic representation of a search engine system in accordance with an embodiment of the invention.

The invention summarized above and defined by the claims below will be better understood by referring to the present detailed description of embodiments of the invention. This description is not intended to limit the scope of claims but instead to provide examples of the invention. Described first is an example of the invention embodied as a search engine system. Described next is an example of the invention embodied as a method of retrieving text.

The first embodiment of the invention is a type of search system described with reference to FIG. 1. More specifically, the first embodiment is a search engine system 10 that retrieves text from at least one full-text dataset 12. Example full-text datasets, as discussed above, include a set of stored emails, an archive of newspaper articles, a registry of patents, and a database of statute provisions, and it is desirable for users to be able to easily retrieve information from the dataset, even if they do not know/remember the exact text to provide as a search argument. As also illustrated with reference to FIG. 2, the full-text dataset 12 has derived therefrom an index 13, segmented text 14, and a listing 15 of the frequency of each word, all of which are discussed in more detail below.

In the first embodiment of the invention, the full-text dataset 12, the index 13, the segmented text 14, and the word frequency listing 15 reside in storage 24 external to the search engine, but the invention as a whole is not limited accordingly. As an example, the storage 24 may be an external USB flash drive. In alternate embodiments, the full-text dataset, the index, the segmented text, and/or the word frequency listing may reside on internal storage of a search engine system or on the same server computer upon which the search engine software resides, as non-limiting examples. In the present embodiment, the search engine system 10 communicates with the storage 24 through an interface 26, which may include a USB socket, a USB plug, and the leads serving as part of the circuit path between the search engine system 10 and the storage 24.

A user may operate the search engine system 10 by accessing a user device 28 directly connected to the search engine system 10 through an interface 30 or by accessing a user device 32 that communicates with the search engine system 10 through the Internet 34 or another network. Example user devices include personal computers, workstations, smart phones, and tablets. In this embodiment, the search engine system 10 is connected to the Internet 34 through an interface 36. Examples of such interfaces 30, 36 include known wired or wireless connections. Generally, the interfaces 30, 36 are operative to receive from the user devices 28, 32, respectively, the text to be searched and to send search results to the user devices 28, 32. In alternate embodiments, both the search engine and user device functionalities are provided by the same computing device, for example, a personal computer or work station, and the interface functionality is provided by the media for signal flow between components.

The search engine system 10 also includes a processor 38, which is operatively connected to the interfaces 26, 30, and 36. Non-limiting examples of such a processor 38 include an Intel Pentium Processor E5400, an Intel Xeon 5130 CPU, and Apple processors, such as the Apple M1.

The search engine system 10 further includes storage operatively connected to the processor 38. Types of storage include a hard drive 40 and cache memory 42. Non-limiting examples of hardware suitable for implementation as the hard drive 40 include a SATA hard drive, a flash memory SSD, and an Apple drive. A non-limiting example of a cache memory is one that is part of an external drive. In the present embodiment, search engine software 44 resides on the hard drive 40. That is, the hard drive 40 holds instructions that when executed activate the processor 38 to perform a sequence of steps that find text in the full-text database 12 that the processor 38 sends to the requesting user device 28 as search results. Examples of such sequence of steps are discussed with reference to FIG. 3 next.

Figure 3:
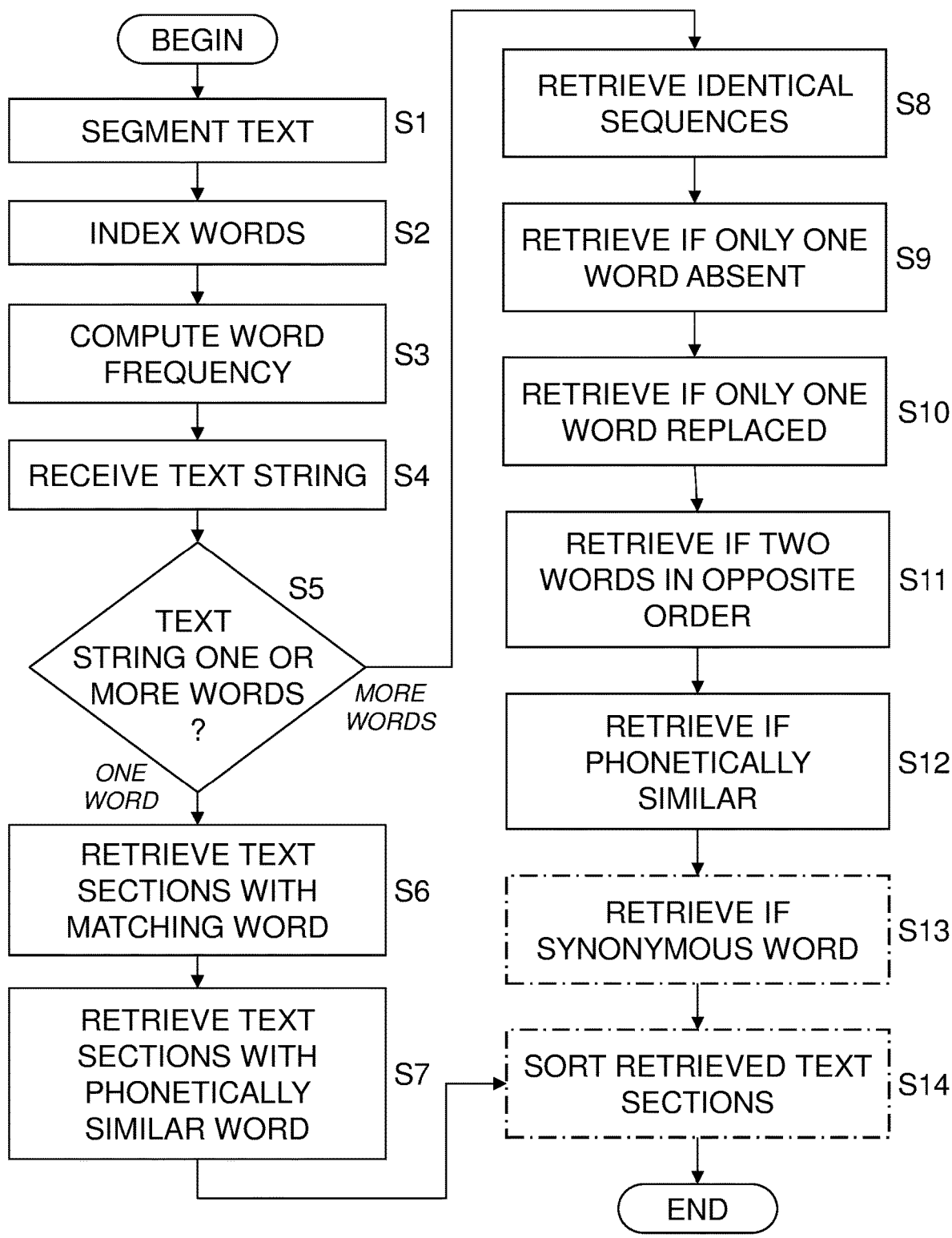
FIG. 3 provides a flowchart representative of methods of retrieving text in accordance with alternate embodiments of the invention.

The second embodiment of the invention described herein with reference to FIG. 3 is a method of retrieving text from a full-text dataset. The method may be executed using the search engine system 10 illustrated in FIG. 1.

The first step of the method is to operate the search system to segment the text of the full-text dataset into text sections. (Step S1.) As non-limiting examples, the segmented text sections can have 50 or 100 words. The segmented text sections then become available to display, if text therein fulfills certain search criteria as discussed below.

The second step of the method is to operate the search system to index the words of the full-text dataset into sets of consecutive words. (Step S2.) As non-limiting examples, the indexed text sets may have four or five words. The search criteria discussed below are applied to the indexed word sets to determine whether to retrieve the associated text sections having the indexed word sets.

The next step is to compute the frequencies of the words in the full-text dataset (Step S3), except for frequencies of specified stop list words. The frequency of a particular word is indicative of its prevalence in the dataset, and this frequency can be used later for sorting search results, as discussed below. The stop list words, that is, those words that are filtered out, are selected as those words that are extremely-common in datasets such that searching for them would most likely bring too many search results. Commonly-selected stop list words are "a", "the," "is," "are," and many prepositions. The particular stop list words for an implementation of the present embodiments may be selected by the developer from established lists or generated specially for a particular implementation. Alternatively, the user may select a dataset of stop list words for this step.

Figure 2:
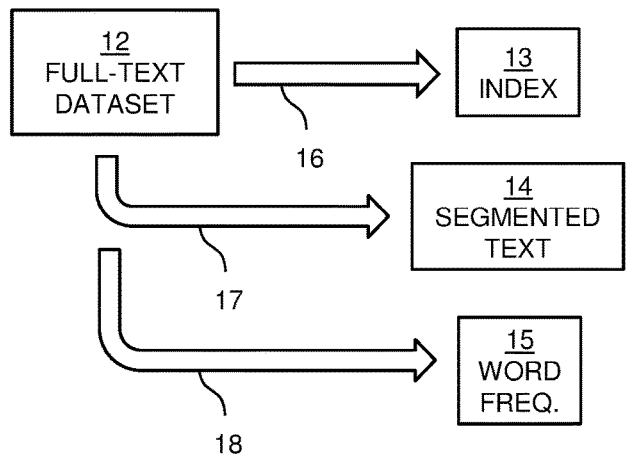
FIG. 2 provides an example full-text dataset and derived index, segmented text, and word frequency listing that are compatible with the search engine system of FIG. 1.

The next step is to receive from a user input device, such as user device 28 or user device 32 in FIG. 1, a text string to be searched as a query. (Step S4.) The text string, which becomes the search argument, may have only one word, or it may have multiple words.

The search engine then determines whether the text string has one word or multiple words. (Step S5.) Considerations of whether a word such as "night-light," a compound word separating its individual parts by a hyphen, is recognized as one or two words is made by one skilled in the art when implementing the search engine.

If the text string has only one word, the search engine searches the text sets that were indexed in Step S2 for that one word and, if found, retrieves the associated text sections segmented in Step S1 that have that one word. (Step S6.) The search engine also searches the text sets for any word that is phonetically-similar to the searched word and, if found, retrieves the associated text sections that have a phonetically-similar word. (Step S7.) Whether a word is phonetically-similar can be determined by any suitable method, a non-limited example of such being described in U.S. Pat. No. 10,409,861, hereby incorporated by reference in its entirety.

If the determination is Step S5 is that the input text string (the query) has more than one word, the search engine searches the indexed text sets for sequences of words that are identical to the sequence of words in the query, after disregarding the stop list words in both the query and in the text sections. If such identical sequences are found, the search engine retrieves the associated segmented text sections. (Step S8.) For example, with reference to FIG. 4, if a user wanting to find text 50:

"Attached please find a contract of purchasing a building from Mr. Ellenberg.

We were supposed to get our payment two weeks ago but no payment has been received,"

Step S8 of the present embodiment would retrieve the text section containing that text, if the user entered the text string 52, "contract of purchasing a building from Mr. Ellenberg" or the text string 54, "contract for purchasing a building from Mr. Ellenberg." This is because text string 52 is identical to a sequence of text in text section 50, and text string 54 is also identical to a sequence of text in text section 50, after the stop list words, including "of" and "for," are disregarded.

The search engine then searches the indexed text sets for sequences of words that are otherwise identical to the sequence of words in the query, after disregarding the stop list words in both the query and in the text sections, except that one word is missing in either the query or in the text section. (An alternate wording of this condition is that the search engine searches for otherwise identical sequences, expect that one ward is added. The search results are the same.) If such nearly identical sequences are found, the search engine retrieves the associated segmented text sections. (Step S9.)

As an example of Step S9 in execution, again with reference to FIG. 4, if a user wants to find text 50, this step would retrieve the text section containing that text, if the user entered the text string 56, "contract of purchasing from Mr. Ellenberg" or the text string 58, "contract of purchasing an old building from Mr. Ellenberg." This is because, after disregarding stop list words, text string 56 is otherwise identical to a sequence of text in text section 50, except that the word "building" is missing in query 56, and text string 58 is otherwise identical to a sequence of text in text section 50, except that "old" is added to query 58.

The search engine then searches the indexed text sets for sequences of words that are otherwise identical to the sequence of words in the query, after disregarding the stop list words in both the query and in the text sections, except that one word in either the query or in the text section is replaced by another word. If such otherwise identical sequences are found, the search engine retrieves the associated segmented text sections. (Step S10.) As an example, if a user wants to find text 50, this step would retrieve the text section containing that text, if the user entered the text string 60, "contract of purchasing a house from Mr. Ellenberg" because, after disregarding stop list words, text string 60 is otherwise identical to a sequence of text in text section 50, except that the word "building" is replaced by "house" in query 60.

The search engine then searches the indexed text sets for sequences of words that are otherwise identical to the sequence of words in the query, after disregarding the stop list words in both the query and in the text sections, except that two adjacent words in the query appear in the opposite order in the text section. If such otherwise identical sequences are found, the search engine retrieves the associated segmented text sections. (Step S11.) As an example, if a user wants to find text 50, this step would retrieve the text section containing that text, if the user entered the text string 62, "purchasing contract of a building from Mr. Ellenberg" because, after disregarding stop list words, text string 62 is otherwise identical to a sequence of text in text section 50, except that it recites "purchasing contract" instead of "contract of purchasing."

The search engine then searches the indexed text sets for sequences of words that are otherwise identical to the sequence of words in the query, after disregarding the stop list words in both the query and in the text sections, except that not more than a specified fraction of words in the query and in the text section are not identical but are phonetically similar. A non-limiting specified fraction is one out of every six words. If such otherwise identical sequences are found, the search engine retrieves the associated segmented text sections. (Step S12.) As an example, if a user wants to find text 50, this step would retrieve the text section containing that text, if the user enters the text string 64, "contract of purchasing a building from Mr. Allenburg," because, after disregarding stop list words, text string 64 is otherwise identical to a sequence of text in text section 50, except that it recites "Allenburg" instead of "Ellenberg," and "Allenburg" is phonetically similar to "Ellenberg."

In the present embodiment, the search now ends, and the search engine may send the retrieved text sections for display on a user device, such as user device 28 or 32 in FIG. 1. In some implementations, the search engine sorts the retrieved text sections according to a sorting index. One example sorting index provides for a higher sorting index for a retrieved text section, when the number of words in the query that match words in the text section is higher, the higher sorting index causing the text section to be displayed before a text section having a lower sorting index. Another example sorting index relates to the results of Step S12, that is, when the query and the retrieved text section have identical sequences of words, except that not more than a specified fraction of words are not identical but are phonetically similar. In this case, the sorting index for a retrieved text section is higher when the fraction of retrieved words (the "retrieved fraction) that are phonetically similar but not identical is lower. Note that the retrieved fraction is not necessarily equal to the specified fraction. A third example sorting index provides for a higher sorting index for a retrieved text section, when the frequency of the words in the dataset (determined in Step S3) that match words in the query is lower. These examples of sorting indexes are only a few of the many that may be suitable to an implementation, and multiple sorting indices, such as one or more of the three examples disclosed herein, can be combined for use within the same search engine.

Many variations of the embodiment though are within the scope of the invention. For example, although the present embodiment is implemented to execute each of Steps S8-S12, alternate implementations may execute any combination of only a fraction of one to four out of the five steps discussed. Another example variation is to execute steps simultaneously or in different orders, such as reversing the order of Step S9 and Step S10.

Another example implementation includes an alternate step, which is a variation of Step S10. The variation may be implemented as discussed above with any combination of one or more of Steps S8, S9, S11, and S12. This implementation also searches the indexed text sets for sequences of words that are otherwise identical to the sequence of words in the query, after disregarding the stop list words in both the query and in the text sections, except that the one word in either the query or in the text section is replaced by another word that is synonymous but not identical to the word it replaces. Two words may be determined to be synonymous, for example, by reference to a suitable "thesaurus-type" dataset as is understood in the art. The particular dataset for an implementation of the present embodiment may be selected by the developer from established datasets or generated specially for the particular implementation. Alternatively, the user may select the dataset of for this step. If indexed text is found with an otherwise identical sequence, but one word is replaced with a synonymous word, the search engine retrieves the associated segmented text sections. (Step S12.)

As an example of the execution of Step S12, if a user wants to find text 50, this step would retrieve the text section containing that text, if the user enters the text string 66, "contract of buying a building from Mr. Ellenberg," because, after disregarding stop list words, text string 66 is otherwise identical to a sequence of text in text section 50, except that "buying" is a synonym of "purchasing." As alternative implementations, this step may be implemented to retrieve text sections that have more than one synonymous word substitutions.

Still more implementations of the embodiments are within the scope of the invention. For example, the implementations may be applied to environments in which the text of a dataset is already segmented into text sections, the words of a dataset are already indexed into sets of consecutive words, and/or the frequencies of the words in the dataset are already computed.

Having thus described exemplary embodiments of the invention, it will be apparent that various alterations, modifications, and improvements will readily occur to those skilled in the art. Alternations, modifications, and improvements of the disclosed invention, though not expressly described above, are nonetheless intended and implied to be within spirit and scope of the invention. Accordingly, the foregoing discussion is intended to be illustrative only; the invention is limited and defined only by the following claims and equivalents thereto.

What is claimed is:

1. A method of retrieving text from a full-text dataset that is segmented into text sections of text strings, the method comprising:
   receiving by a search system from a user input device a text string to be searched as a query, the query text string including one or more words;
   when the query text string has one word only, retrieving text sections from the full-text dataset that include the query's one word or a phonetically similar word; and
   when the query text string includes more than one word, considering whether each of the following conditions apply after disregarding specified stop list words from both the query and the text sections:
      the sequences of words in the query and in the text section are identical;
      the sequences of words in the query and in the text section are identical, except that one word is missing in either the query or in the text section;
      the sequences of words in the query and in the text section are identical except that one word in either the query or in the text section is replaced by another word;
      the sequences of words in the query and in the text section are identical, except that two adjacent words in the query appear in the opposite order in the text section; and
      the sequences of words in the query and in the text section are identical, except that not more than a specified fraction of words in the query and in the text section are not identical but are phonetically similar;
   and then retrieving text sections from the full-text dataset in which one or more of above conditions apply after disregarding specified stop list words from both the query and the text sections.

2. The method of claim 1, wherein, for the condition of retrieving text sections in which, except for one word replaced by another word the sequences of words are identical, the text sections are retrieved if the replaced word is synonymous but not identical to the word it replaces.

3. The method of claim 1 further comprising:
   before retrieving text sections:
      segmenting the text of the full-text dataset into sections; and
      indexing words of the full-text dataset into sets of consecutive words.

4. The method of claim 1 further comprising:
   computing the frequencies of the words in the full-text dataset, except for the specified stop list words.

5. The method of claim 1 further comprising:
   sorting the retrieved text sections according to a sorting index;
   wherein the sorting index for a retrieved text section is higher when the number of words in the query that match words in the text section is higher.

6. The method of claim 1 further comprising:
   sorting the retrieved text sections according to a sorting index;
   wherein, for text sections retrieved for fulfilling the condition that the sequences of words in the query and in the text section are identical, except that a specified fraction of words that are not identical but are phonetically similar, the sorting index for a retrieved text section is higher when the determined fraction of retrieved words that are phonetically similar but not identical is lower.

7. The method of claim 4 further comprising:
   sorting the retrieved text sections according to a sorting index;
   wherein the sorting index for a retrieved text section is higher when the frequency of the words in the dataset that match words in the query is lower.

8. A search engine system for retrieving text from a full-text dataset that is segmented into text sections of text strings, the search engine system comprising:
   one or more interfaces operative: (1) to receive from a user input device a text string to be searched as a query, the query text string including one or more words, and (2) to send to the user device search results;
   a processor operatively connected to the one or more interfaces; and storage operatively connected to the processor and holding instructions that when executed activate the processor to:

when the query text string has one word only, retrieve text sections from the full-text dataset that include the query's one word or a phonetically similar word; and when the query text string includes more than one word, considering whether each of the following conditions apply after disregarding specified stop list words from both the query and the text sections:

the sequences of words in the query and in the text section are identical;

the sequences of words in the query and in the text section are identical, except that one word is missing in either the query or in the text section;

the sequences of words in the query and in the text section are identical except that one word in either the query or in the text section is replaced by another word;

the sequences of words in the query and in the text section are identical, except that two adjacent words in the query appear in the opposite order in the text section; and the sequences of words in the query and in the text section are identical, except that not more than a specified fraction of words in the query and in the text section are not identical but are phonetically similar;

and then retrieving text sections from the full-text dataset in which one or more of above conditions apply after disregarding specified stop list words from both the query and the text sections.

9. The search engine system of claim 8, wherein, for the condition of retrieving text sections in which, except for one word replaced by another word the sequences of words are identical, the text sections are retrieved if the replaced word is synonymous but not identical to the word it replaces.

10. The search engine system of claim 8, wherein the storage holds additional instructions that when executed activate the processor also to:

before retrieving text sections:

segment the text of the full-text dataset into sections; and index words of the full-text dataset into sets of consecutive words.

11. The search engine system of claim 8, wherein the storage holds additional instructions that when executed activate the processor also to:

compute the frequencies of the words in the full-text dataset, except for the specified stop list words; and store the computed frequencies.

12. The search engine system of claim 8, wherein the storage holds additional instructions that when executed activate the processor also to:

sort the retrieved text sections according to a sorting index;

wherein the sorting index for a retrieved text section is higher when the number of words in the query that match words in the text section is higher.

13. The search engine system of claim 8, wherein the storage holds additional instructions that when executed activate the processor also to:

sort the retrieved text sections according to a sorting index;

wherein, for text sections retrieved for fulfilling the condition that the sequences of words in the query and in the text section are identical, except that a specified fraction of words that are not identical but are phonetically similar, the sorting index for a retrieved text section is higher when the determined fraction of retrieved words that are phonetically similar but not identical is lower.

14. The search engine system of claim 11, wherein the storage holds additional instructions that when executed activate the processor also to sort the retrieved text sections according to a sorting index, the sorting index for a retrieved text section being higher when the frequency of the words in the dataset that match words in the query is lower.

\* \* \* \* \*